United States Patent
Xu

(10) Patent No.: US 9,663,186 B2
(45) Date of Patent: May 30, 2017

(54) MID-MOTOR DRIVE SYSTEM FOR AN ELECTRIC BICYCLE

(71) Applicant: Wuxi Aimeike Power Machinery Company Limited, Wuxi, Jiangsu (CN)

(72) Inventor: Lei Xu, Wuxi (CN)

(73) Assignee: WUXI AIMEIKE POWER MACHINERY COMPANY LIMITED, Wuxi (CN)

( * ) Notice: Subject to any disclaimer, the term of this patent is extended or adjusted under 35 U.S.C. 154(b) by 141 days.

(21) Appl. No.: 14/523,967

(22) Filed: Oct. 27, 2014

(65) Prior Publication Data

US 2016/0107720 A1    Apr. 21, 2016

(30) Foreign Application Priority Data

Oct. 21, 2014  (EP) .................................... 14189743

(51) Int. Cl.
  *B62M 6/50*   (2010.01)
  *B62M 6/55*   (2010.01)
  *F16H 37/06*  (2006.01)
  *G01L 3/14*   (2006.01)
  *B62M 11/14*  (2006.01)

(52) U.S. Cl.
  CPC ............... *B62M 6/50* (2013.01); *B62M 6/55* (2013.01); *B62M 11/145* (2013.01); *F16H 37/065* (2013.01); *G01L 3/1435* (2013.01); *B62M 2700/001* (2013.01); *B62M 2701/0069* (2013.01)

(58) Field of Classification Search
  CPC ........ B62M 11/145; B62M 6/50; B62M 6/55; B62M 2700/001; B62M 2701/0069; B62M 25/08; F16H 37/065; G01L 3/00; G01L 3/1435; G01B 7/24; G01P 3/44–3/4956
  USPC ............................ 324/207.2; 73/779, 862.33
  See application file for complete search history.

(56) References Cited

U.S. PATENT DOCUMENTS 5,257,540 A * 11/1993 Bower .................... A61B 5/221
                                            482/900
5,915,493 A *  6/1999 Nakayama ............... B62M 6/40
                                            180/206.4

(Continued)

FOREIGN PATENT DOCUMENTS

CN        103661762 A     3/2014

*Primary Examiner* — Terry Chau

(57) ABSTRACT

The present invention provides a mid-motor drive system for an electric bicycle, which includes a left shell, a right shell, a motor assembly, a gear reduction apparatus, a torque sensor, a central shaft, a controller, and a crankset, and further includes a planetary gear increase apparatus. The gear reduction apparatus is connected to the motor assembly, the planetary gear increase apparatus, and the crankset, the planetary gear increase apparatus is connected to the torque sensor and the central shaft, the torque sensor is connected to the controller, and the controller is connected to the motor assembly. The present invention can allocate an assist ratio of a motor more accurately, so as to achieve the objectives of comfortable riding, energy conservation, and environmental friendliness; meanwhile, a planetary gear increase apparatus is built inside a motor drive system, thereby making a mid-motor drive system more stable and extending a service life.

8 Claims, 4 Drawing Sheets

(56) References Cited

U.S. PATENT DOCUMENTS

| | | | | |
|---|---|---|---|---|
| 6,012,538 | A | * | 1/2000 | Sonobe .................... B62M 6/45 180/206.3 |
| 6,073,717 | A | * | 6/2000 | Yamamoto ............... B62M 6/55 180/206.4 |
| 6,138,520 | A | * | 10/2000 | Chang ................... G01L 3/1435 343/753 |
| 6,418,797 | B1 | * | 7/2002 | Ambrosina .............. B62M 6/40 73/862.29 |
| 8,960,021 | B2 | * | 2/2015 | Wu ....................... G01L 3/1478 73/862.333 |
| 2011/0120232 | A1 | * | 5/2011 | Lassanske ........... B60B 27/0068 73/862.29 |
| 2011/0167920 | A1 | * | 7/2011 | Rink .................... G01D 5/2451 73/760 |
| 2013/0049445 | A1 | * | 2/2013 | Kitamura ........... B60B 27/0068 301/110.5 |

* cited by examiner

MID-MOTOR DRIVE SYSTEM FOR AN ELECTRIC BICYCLE

CROSS-REFERENCE TO RELATED APPLICATIONS

This present invention claims the benefit of European Patent Application No. 14189743.9, filed on Oct. 21, 2014, the contents of which are hereby incorporated by reference.

FIELD OF THE TECHNOLOGY

The present invention relates to a motor drive system, and more particularly to a mid-motor drive system for an electric bicycle.

BACKGROUND

Environmental friendliness is the objective in production and life in the human society nowadays and in the future. Low-carbon and green transport is also the future trend and development direction. Electric bicycles have characteristics such as economy and environmental friendliness, and therefore become desirable exercise devices and vehicles.

An existing electric bicycle is usually assembled with a mid-motor. A mid-motor refers to a motor drive assembly installed at a bottom bracket of an electric bicycle as compared with a front hub motor and a rear hub motor of the electric bicycle. Currently, more and more mid-motors are installed with a torque sensor. The torque sensor detects a pedaling torque during riding, and sends a detected signal to a system controller to synchronously adjust a rotational speed and output power of the motor, so as to keep a direct proportion relationship between the riding torque and the output torque of the motor, thereby achieving an objective of multiplying the torque.

CN103661762A disclosed an electric assist electric bicycle and a mid-motor drive system of the electric assist electric bicycle. The mid-motor drive system of the electric assist electric bicycle includes a first stage end-cover component, a second stage end-cover component, a shell component, a torque sensor component, a motor component, a central shaft component, a planetary reduction mechanism, a clutch mechanism, and a crankset and sprocket component. The planetary reduction mechanism bears all the output torque and is the weakest member in the entire transmission system. With the long-term use of the drive system, the planetary reduction gear has a severe wear problem, which significantly lowers the stability and safety of a mid-drive apparatus.

In addition, an existing torque sensor used for a mid-motor of an electric bicycle is usually a strain gauge sensor. In such a sensor, a strain gauge is disposed on a central shaft of the mid-motor, and a sensor disposed on an outer side of the central shaft then transfers a sensing signal sent by the strain gauge to a controller. Because the strain gauge rotates with the central shaft, the distance between the strain gauge and sensor keeps varying, and therefore a signal is subject to a great extent of attenuation or loss during transmission, resulting in that the controller fails to accurately calculate a pedaling torque of a rider.

SUMMARY

In view of the defects in the prior art, the present invention introduces a planetary gear increase apparatus in a mid-motor drive system for an electric bicycle, improves a torque sensor, and proposes a mid-motor drive system for an electric bicycle.

The technical solution of the present invention is as follows:

A mid-motor drive system for an electric bicycle includes a left shell, a right shell, a motor assembly, a gear reduction apparatus, a torque sensor, a central shaft, a controller, and a crankset, and further includes a planetary gear increase apparatus, where the gear reduction apparatus is connected to the motor assembly, the planetary gear increase apparatus, and the crankset, the planetary gear increase apparatus is connected to the torque sensor and the central shaft, the torque sensor is connected to the controller, and the controller is connected to the motor assembly.

Furthermore, the motor assembly includes a motor stator, a motor internal rotor, and a gear shaft.

Furthermore, the gear reduction apparatus includes a first stage reduction gear wheel, a second stage reduction pinion, a unidirectional bearing, and a second stage reduction gear wheel.

Furthermore, the planetary gear increase apparatus includes a gear ring, a planetary shaft pin, a ratchet fixing seat, an arm, a solar wheel, a ratchet-type unidirectional clutch, and a planetary gear.

Furthermore, the first stage reduction gear wheel of the gear reduction apparatus is engaged with the gear shaft of the motor assembly.

Furthermore, the crankset is installed on the second stage reduction gear wheel of the gear reduction apparatus.

Furthermore, four planetary gears of the planetary gear increase apparatus are fixed on the arm and rotate with the central shaft being the center of circle.

Furthermore, the arm of the planetary gear increase apparatus is installed on the central shaft through a bearing, and the ratchet-type unidirectional clutch is provided between the central shaft and the arm.

Furthermore, the gear ring of the planetary gear increase apparatus is fixed on the second stage reduction gear wheel of the gear reduction apparatus.

Furthermore, the torque sensor is installed on the left shell, and the controller is installed on the right shell.

Furthermore, the torque sensor includes a deformation support, a signal transmission module, and a magnetic component, the deformation support is deformed under a force to actuate the magnetic component to move, and the signal transmission module senses the movement of the magnetic component, converts a change of magnetic flux into an electrical signal, and transfers the electrical signal to the controller.

Furthermore, the signal transmission module of the torque sensor includes a linear Hall element and a signal lead wire.

Furthermore, the solar wheel of the planetary gear increase apparatus is connected to the deformation support through a bearing.

As a preferred implementation manner of the foregoing solution, the deformation support of the torque sensor is an aluminum alloy deformation body, and the magnetic component includes a plastic support, a steel ball, a spring, a circular magnet, and a plastic slider.

As another preferred implementation manner of the foregoing solution, the deformation support of the torque sensor includes a torque transfer support and an aluminum alloy deformation body, and the magnetic component includes a plastic external thread shell, a circular magnet, a spring, a plastic slider, and a plastic internal thread fixing support.

The beneficial effects of the present invention are as follows: A mid-motor drive system for an electric bicycle is provided. A planetary gear increase apparatus is applied to the system, which not only reduces a transmission ratio and achieves a speed increasing effect, but also reduces torques that a crankset and gear reduction part need to bear, so that the mid-motor drive system becomes more stable and has a longer service life. A novel torque sensor is also applied in the system. The novel torque sensor makes use of a characteristic of deformation under a force of an aluminum alloy material. A sensor for detecting an amount of such a deformation is installed in the torque sensor to convert a manpower pedaling torque signal into a voltage signal, and transfers the voltage signal to a controller to control output power of a motor assembly, so as to accurately convert a manpower pedaling torque into an electrical signal and transfer the electrical signal to the controller in real time, so that the controller can allocate motor assistance more properly, thereby achieving the objectives of comfortable riding, energy conservation, and environmental friendliness.

BRIEF DESCRIPTION OF THE DRAWINGS

To illustrate the embodiments of the present invention more clearly, the accompanying drawings for describing the embodiments are introduced briefly in the following. Apparently, the accompanying drawings in the following description are only an embodiment of the present invention, and a person skilled in the art can derive other drawings from the accompanying drawings without creative efforts.

Figure 1:
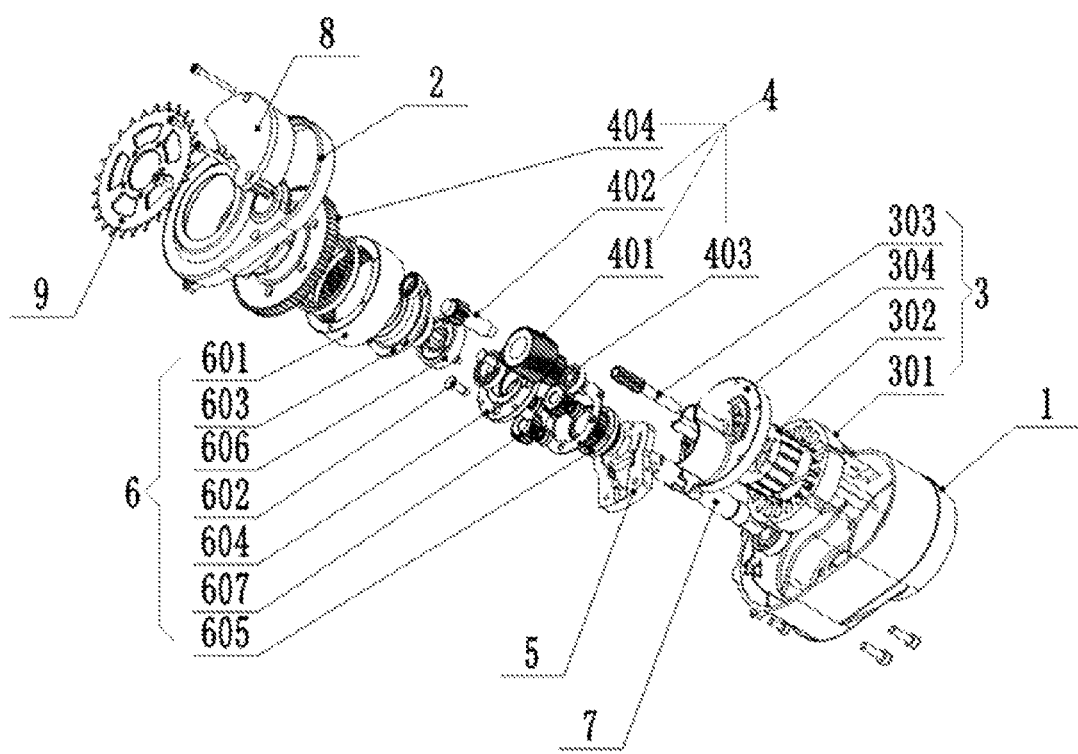
FIG. 1 is a schematic structure view of an embodiment of a mid-motor drive system for an electric bicycle of the present invention.

In the drawings: 1—left shell; 2—right shell; 3—motor assembly; 301—motor stator; 302—motor internal rotor; 303—gear shaft; 304 stator fixing support; 4—gear reduction apparatus; 401—first stage reduction gear wheel; 402—second stage reduction pinion; 403—unidirectional bearing; 404—second stage reduction gear wheel; 5—torque sensor; 501—aluminum alloy deformation body; 502—signal transmission module; 503—plastic support; 504—circular magnet; 505—steel ball; 506—plastic slider; 507—spring; 508—flat-point set screw; 509—solar wheel fixing screw; 510—aluminum alloy deformation body fixing screw; 511—plastic support fixing screw; 512—steel ball groove; 513—second corresponding slot; 514—third corresponding slot; 515—first corresponding slot; 520—torque transfer support; 521—signal transmission module fixing support; 522—plastic external thread shell; 523—plastic internal thread fixing support; 524—torque transfer support fixing screw; 525—plastic internal thread fixing support fixing screw; 6—planetary gear increase apparatus; 601—gear ring; 602—planetary shaft pin; 603—ratchet fixing seat; 604—arm; 605—solar wheel; 606—ratchet-type unidirectional clutch; 607—planetary gear; 7—central shaft; 8—controller; 9—crankset.

DETAILED DESCRIPTION

The present invention is further illustrated in the following with reference to specific implementation manners. The accompanying drawings are merely used for exemplary illustration and are only schematic views rather than pictures of practical objects, and should not be construed as a limit to the patent; to illustrate the embodiments of the present invention more effectively, some members in the accompanying drawings are omitted or scaled up or down, which do not represent the sizes of a practical product; persons skilled in the art should understand that some common structures in the drawings and illustration thereof may be omitted.

Embodiment 1

Figure 2:
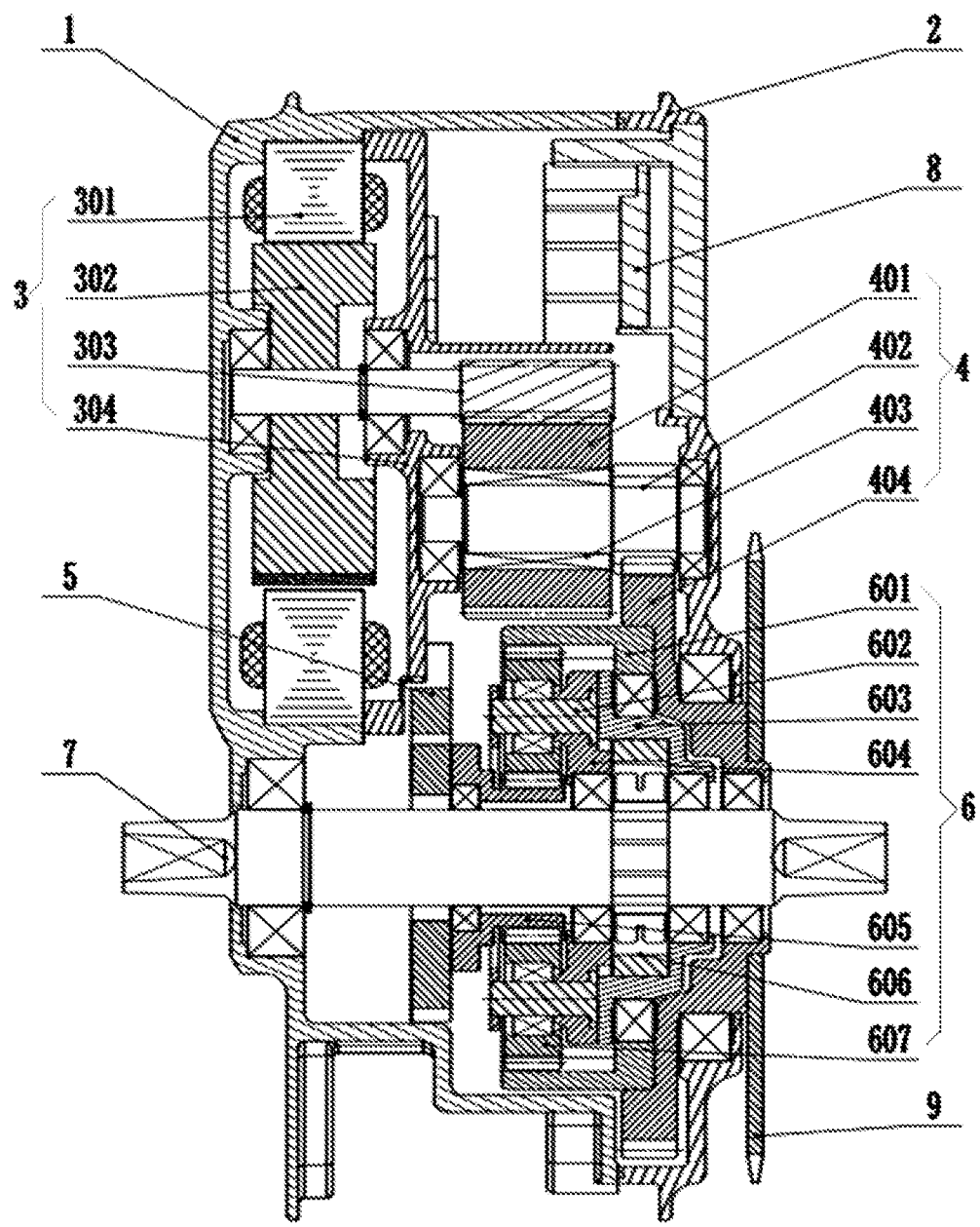
FIG. 2 is an exploded view of a mid-motor drive system for an electric bicycle according to the present invention.

Referring to FIG. 1 and FIG. 2, a mid-motor drive system for an electric bicycle of the present invention includes a left shell 1, a right shell 2, a motor assembly 3, a gear reduction apparatus 4, a torque sensor 5, a planetary gear increase apparatus 6, a central shaft 7, a controller 8, and a crankset 9. The motor assembly 3 includes a motor stator 301, a motor internal rotor 302, and a gear shaft 303. The gear reduction apparatus 4 includes a first stage reduction gear wheel 401, a second stage reduction pinion 402, a unidirectional bearing 403, and a second stage reduction gear wheel 404. The planetary gear increase apparatus 6 includes a gear ring 601, a planetary shaft pin 602, a ratchet fixing seat 603, an arm 604, a solar wheel 605, a ratchet-type unidirectional clutch 606, and a planetary gear 607. The gear reduction apparatus 4 is connected to the motor assembly 3, the planetary gear increase apparatus 6, and the crankset 9. The planetary gear increase apparatus 6 is connected to the torque sensor 5 and the central shaft 7. The torque sensor 5 is connected to the controller 8. The controller 8 is connected to the motor assembly 3.

The gear reduction apparatus 4 is a two stage transmission reduction apparatus. The unidirectional bearing 403 is provided inside the first stage reduction gear wheel 401, so as to achieve an objective of preventing the motor internal rotor 302 from rotating along during manpower pedaling. The controller 8 is used for controlling output power of the motor assembly 3. After the motor assembly 3 is powered on, the motor internal rotor 302 rotates, and because the gear shaft 303 is connected to the internal rotor 302, the gear shaft 303 rotates synchronously. The first stage reduction gear wheel 401 is engaged with the gear shaft 303 to rotate at a fixed reduction ratio. The unidirectional bearing 403 is securely fixed in an inner cavity of the first stage reduction gear wheel 401. The second stage reduction pinion 402 is installed in the unidirectional bearing 403, and because of an unidirectional locking effect of the unidirectional bearing 403, the first stage reduction gear wheel 401 and the second stage reduction pinion 402 rotate synchronously. The second stage reduction pinion 402 is engaged with the second stage reduction gear wheel 404, so as to rotate at a fixed reduction ratio. The crankset 9 is fixed on the second stage reduction gear wheel 404 of the gear reduction apparatus 4 and is used for outputting power of the motor assembly 3.

The torque sensor 5 is an aluminum alloy deformation-type sensor. By using a characteristic of deformation under a force of an aluminum alloy material, a sensor for detecting an amount of such a deformation is installed inside the torque sensor 5 to convert a manpower pedaling torque signal into a voltage signal, and transfers the voltage signal to the controller 8 to control the output power of the motor assembly 3.

Figure 3:
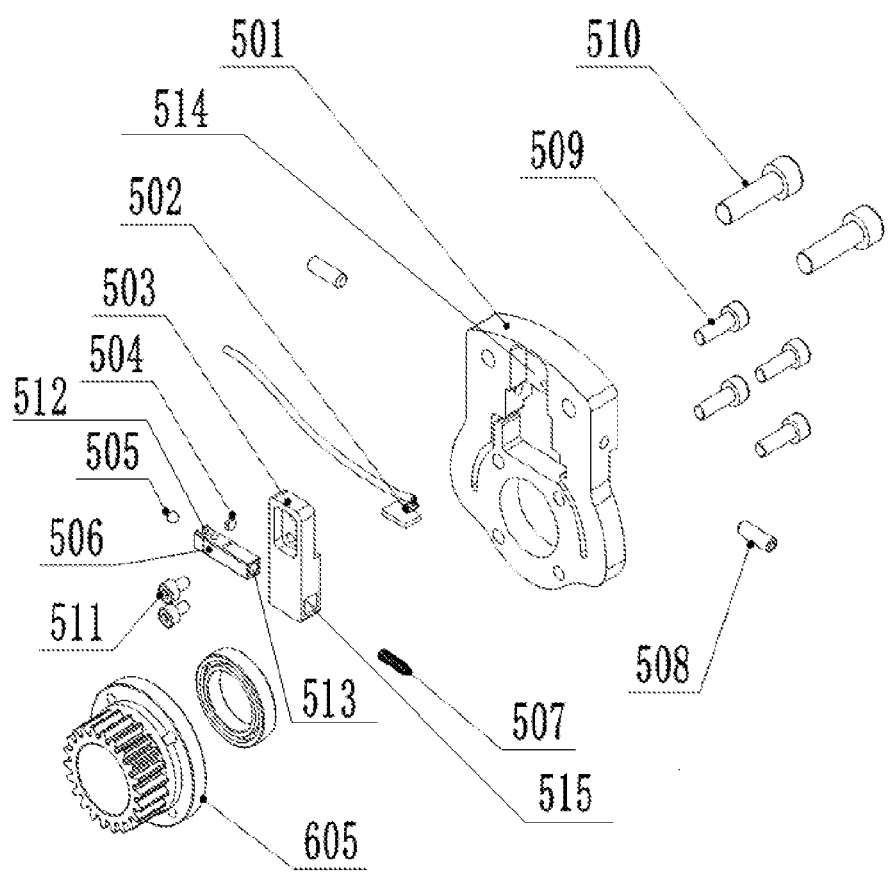
FIG. 3 is an exploded view of an embodiment of a torque sensor in a mid-motor drive system for an electric bicycle according to the present invention.
Figure 4:
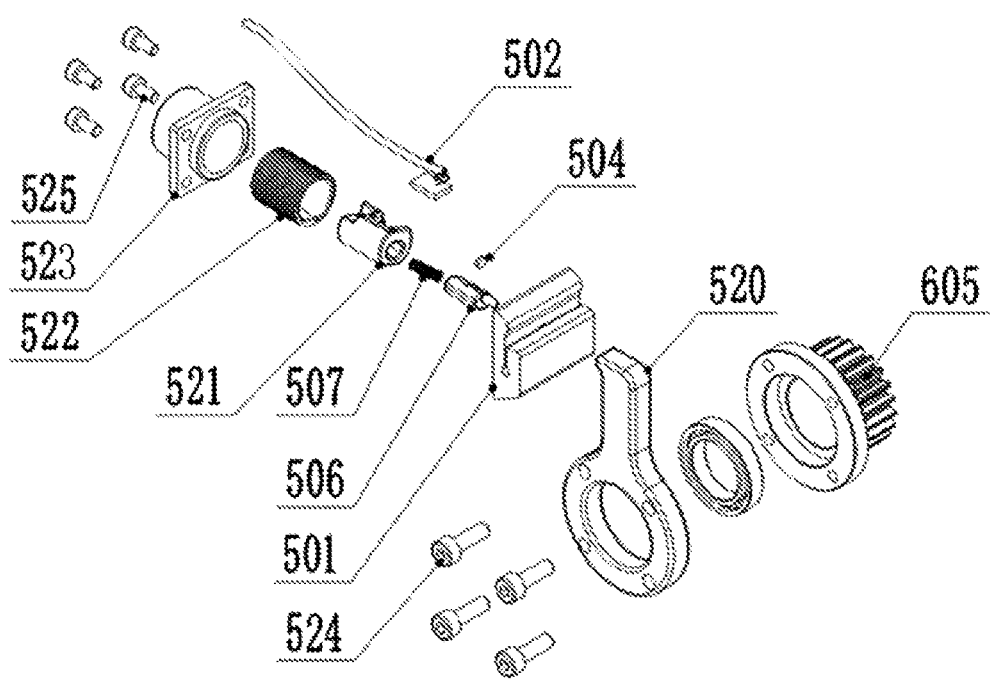
FIG. 4 is an exploded view of another embodiment of a torque sensor in a mid-motor drive system for an electric bicycle according to the present invention.

FIG. 3 is an exploded view of the torque sensor 5 in a mid-motor drive system for an electric bicycle according to the present invention. The torque sensor includes a deformation support, a signal transmission module (502), and a magnetic component. The deformation support is deformed under a force to actuate the magnetic component to move. The signal transmission module (502) senses the movement of the magnetic component, converts a change of magnetic flux into an electrical signal, and transfers the electrical signal to the controller (8). The signal transmission module 502 of the torque sensor further includes a linear Hall element and a signal lead wire. The steps of assembling the torque sensor 5 are as follows:

First, a circular magnet 504 is mounted in a plastic slider 506, a steel ball 505 is mounted inside a steel ball groove 512 on the plastic slider 506, the plastic slider 506 is then also mounted inside a corresponding slot the first corresponding slot 515 on a plastic support 503, and a spring 507 is mounted inside a corresponding slot the second corresponding slot 513 of the plastic slider 506, so as to form the magnetic component of the torque sensor 5. Next, the signal transmission module 502 is also mounted inside the corresponding slot on the plastic support 503, and finally, the plastic support 503 is mounted in the deformation support, that is, inside a corresponding slot the third corresponding slot 514 on an aluminum alloy deformation body 501, and a plastic support fixing screw 511 is used for fastening. Subsequently, a flat-point set screw 508 is mounted at two sides of the aluminum alloy deformation body 501 to further lock the plastic support 503; meanwhile, the horizontal distance inside the groove between the circular magnet 504 and the Hall element on the signal transmission module 502 may also be adjusted conveniently, so as to keep an output initial signal consistent. Further, a bearing is pressed in the solar wheel 605, and four solar wheel fixing screws 509 are used to fix the solar wheel 605 on the aluminum alloy deformation body 501. Finally, an aluminum alloy deformation body fixing screw 510 is used to fix the aluminum alloy deformation body 501 on the left shell 1.

When manpower pedaling drives the central shaft 7 to rotate and actuate the arm 604 to rotate, the solar wheel 605 is subject to a driving force in a same direction. The direction of the driving force is a tangent direction of the direction of the rotation. With the increase of a pedaling force, the tangent force that the solar wheel 605 bears increases gradually. The aluminum alloy deformation body 501 is fixedly connected to the solar wheel 605 through a bearing, and therefore the tangent force that the aluminum alloy deformation body 501 bears also increases gradually, and the aluminum alloy deformation body 501 starts to deform in the direction of the tangent force, which forces the steel ball 505 to move in the same direction. The circular magnet 504, the steel ball 505, and the plastic slider 506 displace together. After the displacement occurs, the linear Hall element on the signal transmission module 502 senses a change of a magnetic field of the circular magnet 504 and outputs a corresponding voltage signal. The voltage signal is directly transmitted to the controller 8 through the signal lead wire. The controller 8 properly allocates output power of the motor assembly 3 according to the magnitude of the signal. After pedaling is stopped, the solar wheel 605 no longer bears any force, and the deformation of the aluminum alloy deformation body 501 stops. Under the effect of the spring 507, the spring 507 restores the circular magnet 504, the steel ball 505, and the plastic slider 506 to the original positions. The linear Hall element on the signal transmission module 502 senses no change of the magnetic field and therefore outputs no voltage signal, and the motor assembly 3 stops outputting power.

The planetary gear increase apparatus 6 includes one solar wheel 605, four planetary gears 607, one arm 604, one gear ring 601, and one ratchet-type unidirectional clutch 606. The solar wheel 605 is connected to the torque sensor 5 to transfer a manpower pedaling torque. The four planetary gears 607 are fixed on the arm 604 and rotate with the central shaft 7 being the center of circle rotate. The arm 604 is installed on the central shaft 7 through a bearing. The ratchet-type unidirectional clutch 606 is provided between the central shaft 7 and the arm 604. The ratchet-type unidirectional clutch 606 may prevent the planetary gear increase apparatus 6 and the motor internal rotor 302 from rotating along when the central shaft 7 rotates inversely. The gear ring 601 is fixed on the second stage reduction gear wheel 404 of the gear reduction apparatus 4.

The effects of the planetary gear increase apparatus 6 include the following two: The first is a speed increasing effect. In the planetary gear increase apparatus 6, the solar wheel 605 is fixed on the torque sensor 5. When the arm 604 serves as a driving member, the gear ring 601 is run as a driven member. Assuming that a gear ratio between the gear ring 601 and the solar wheel 605 in the planetary gear increase apparatus 6 is a, the transmission ratio of the gear train is a/(a+1). Because the arm 604 is a gear having the maximum equivalent number of teeth, the passive gear ring 601 provides output in a speed increase manner, and the transmission ratio between the arm 604 and the gear ring 601 is smaller than 1. The second is a torque transfer effect. The manpower pedaling torque is transferred to the central shaft 7. The central shaft 7 transfers the torque to the arm 604 through the ratchet-type unidirectional clutch 606. The arm 604 rotates clockwise, and at the same time actuates the planetary gear 607 to rotate clockwise. In this case, the solar wheel 605 exerts a counter force on the planetary gear 607. In this process, under the effect of the counter force, the aluminum alloy deformation body 501 on the torque sensor 5 deforms, and the linear Hall element on the signal transmission module 502 determines an amount of the deformation to output a linear voltage signal.

The objective of speed increase of the planetary gear increase apparatus 6 is as follows: In a case of ensuring a proper pedaling frequency of riding, the number of teeth of the crankset 9 is reduced, so that the gear ratio between the crankset and a freewheel of a rear wheel of the electric bicycle is reduced, a torque that needs to be provided to drive the rear wheel is then reduced, and the reduction of the output torque of the crankset 9 means that the torque that the gear reduction apparatus 4 needs to bear is also reduced. In this way, the strength requirement of the entire gear reduction apparatus 4 is also reduced correspondingly, so that the safety and stability of a mid-drive apparatus are enhanced to a great extent.

The controller 8 is installed on the right shell 2, and the wiring between the controller 8 and the motor assembly 3 is accomplished inside a same box, thereby greatly reducing loss caused in the wiring process, so that the efficiency of the motor assembly 3 is enhanced.

Embodiment 2

A mid-motor drive system for an electric bicycle of the present invention includes a left shell 1, a right shell 2, a motor assembly 3, a gear reduction apparatus 4, a torque sensor 5, a planetary gear increase apparatus 6, a central shaft 7, a controller 8, and a crankset 9. The differences from Embodiment 1 are as follows: A deformation support of the torque sensor 5 includes a torque transfer support 520 and an aluminum alloy deformation body 501 (the aluminum alloy deformation body 501 has a different form from the aluminum alloy deformation body 501 in Embodiment 1). A magnetic component includes a plastic external thread shell 522, a circular magnet 504, a spring 507, a plastic slider 506, and a plastic internal thread fixing support 523. The torque sensor 5 further includes a torque transfer support fixing screw 524 and a plastic internal thread fixing support fixing screw 525. The deformation support is deformed under a force to actuate the magnetic component to move. A signal transmission module 502 senses the movement of the magnetic component, converts a change of magnetic flux into an electrical signal, and transfers the electrical signal to the controller 8.

When the torque sensor 5 is being assembled, the circular magnet 504 is first mounted in the plastic slider 506, the spring 507 is mounted in a cylindrical groove behind the plastic slider 506, the signal transmission module 502 is mounted inside a sliding groove of a signal transmission fixing support 521, the signal transmission fixing support 521 is then mounted inside a corresponding slot of the plastic external thread shell 522, the plastic external thread shell 522 is finally screwed inside a corresponding internal thread tube of the plastic internal thread fixing support 523, and a plastic internal thread fixing screw 525 is used to fix the entire plastic internal thread fixing support 523 on the aluminum alloy deformation body 501. A bearing is pressed in the assembled torque sensor 5, and a solar wheel 605 is fixed on the torque transfer support 520 through four torque transfer fixing screws 524.

When the central shaft 7 is driven by manpower to rotate and actuate an arm 604 to rotate, the solar wheel 605 is subject to a driving force in a same direction. With the increase of a pedaling force, a torque that the solar wheel 605 bears increases gradually. The solar wheel 605 and the torque transfer support 520 are fixed together, and therefore a torque that the torque transfer support 520 bears also increases gradually. The aluminum alloy deformation body 501 deforms when being pressed by the torque transfer support 520. With the increase of the torque, an amount of the deformation of the aluminum alloy deformation body 501 also increases. The plastic slider 506 displaces to the opposite direction and actuates the circular magnet 504 to displace together. In this case, a linear Hall element on the signal transmission module 502 senses a change of a magnetic field of the circular magnet 504, so as to generate a corresponding voltage signal. The voltage signal is directly transmitted to the controller 8 through a signal lead wire. The controller 8 properly allocates output power of the motor assembly 3 according to the magnitude of the signal. After pedaling is stopped, the solar wheel 605 no longer bears any force, and the deformation of the aluminum alloy deformation body 501 stops. Under the effect of the spring 507, the spring 507 restores the circular magnet 504, the steel ball 505, and the plastic slider 506 to the original positions. The linear Hall element on the signal transmission module 502 senses no change of the magnetic field and therefore outputs no voltage signal, and the motor assembly 3 stops outputting power.

The foregoing only provides preferred embodiments of the present invention rather than to limit the present invention. Any modifications, equivalent replacements, and improvements made without departing from the spirit and principle of the present invention shall fall within the protection scope of the present invention.

What is claimed is:

1. A mid-motor drive system for an electric bicycle, comprising a left shell (1), a right shell (2), a motor assembly (3), a gear reduction apparatus (4), a torque sensor (5), a central shaft (7), a controller (8), and a crankset (9), and further comprising a planetary gear increase apparatus (6), wherein the gear reduction apparatus (4) is connected to the motor assembly (3), the planetary gear increase apparatus (6), and the crankset (9), the planetary gear increase apparatus (6) is connected to the torque sensor (5) and the central shaft (7), the torque sensor (5) is connected to the controller (8), and the controller (8) is connected to the motor assembly (3), the torque sensor (5) comprises a deformation support, a signal transmission module (502), and a magnetic component, the deformation support is deformed under a force to actuate the magnetic component to move, and the signal transmission module (502) senses the movement of the magnetic component, converts a change of magnetic flux into an electrical signal, and transfers the electrical signal to the controller (8), the motor assembly (3) comprises a motor stator (301), a motor internal rotor (302), and a gear shaft (303);

the gear reduction apparatus (4) comprises a first stage reduction gear wheel (401), a second stage reduction pinion (402), a unidirectional bearing (403), and a second stage reduction gear wheel (404);

the planetary gear increase apparatus (6) comprises a gear ring (601), a planetary shaft pin (602), a ratchet fixing seat (603), an arm (604), a solar wheel (605), a ratchet-type unidirectional clutch (606), and a planetary gear (607);

the torque sensor (5) is installed on the left shell (1), and the controller (8) is installed on the right shell (2);

wherein the deformation support of the torque sensor (5) is an aluminum alloy deformation body (501), and the magnetic component comprises a plastic support (503), a steel ball (505), a spring (507), a circular magnet (504), and a plastic slider (506).

2. The mid-motor drive system for the electric bicycle according to claim 1, wherein the first stage reduction gear wheel (401) of the gear reduction apparatus (4) is engaged with the gear shaft (303) of the motor assembly (3).

3. The mid-motor drive system for the electric bicycle according to claim 1, wherein the crankset (9) is installed on the second stage reduction gear wheel (404) of the gear reduction apparatus (4).

4. The mid-motor drive system for the electric bicycle according to claim 1, wherein four planetary gears (607) of the planetary gear increase apparatus (6) are fixed on the arm (604) and rotate with the central shaft (7) being the center of rotation.

5. The mid-motor drive system for the electric bicycle according to claim 1, wherein the arm (604) of the planetary gear increase apparatus (6) is installed on the central shaft (7) through a bearing, and the ratchet-type unidirectional clutch (606) is provided between the central shaft (7) and the arm (604).

6. The mid-motor drive system for the electric bicycle according to claim 1, wherein the gear ring (601) of the planetary gear increase apparatus (6) is fixed on the second stage reduction gear wheel (404) of the gear reduction apparatus (4).

7. The mid-motor drive system for the electric bicycle according to claim 1, wherein the signal transmission module (502) of the torque sensor (5) comprises a linear Hall element and a signal lead wire.

8. The mid-motor drive system for the electric bicycle according to claim 1, wherein the solar wheel (605) of the planetary gear increase apparatus (6) is connected to the deformation support.

* * * * *